(12) United States Patent
Katsuda (10) Patent No.: US 8,437,028 B2
(45) Date of Patent: May 7, 2013

(54) IMAGE COMBINING APPARATUS AND METHOD FOR ALIGNING POSITIONS OF IMAGES

(75) Inventor: Takeo Katsuda, Koto-ku (JP)

(73) Assignee: Konica Minolta Business Technologies, Inc., Chiyoda- Ku, Tokyo (JP)

( * ) Notice: Subject to any disclaimer, the term of this patent is extended or adjusted under 35 U.S.C. 154(b) by 322 days.

(21) Appl. No.: 13/020,062

(22) Filed: Feb. 3, 2011

(65) Prior Publication Data
US 2011/0199636 A1 Aug. 18, 2011

(30) Foreign Application Priority Data
Feb. 15, 2010 (JP) ................................. 2010-030034

(51) Int. Cl.
*G06F 15/00* (2006.01)
(52) U.S. Cl.
USPC .......................................................... 358/1.15
(58) Field of Classification Search .................. 358/1.15
See application file for complete search history.

(56) References Cited

U.S. PATENT DOCUMENTS
2011/0109678 A1* 5/2011 Schwartz et al. ............... 347/14

FOREIGN PATENT DOCUMENTS
| JP | 9-51423 A | 2/1997 |
| JP | 9-51424 A | 2/1997 |
| JP | 2001-16384 A | 1/2001 |

* cited by examiner

Primary Examiner — Saeid Ebrahimi Dehkordy
(74) Attorney, Agent, or Firm — Buchanan Ingersoll & Rooney PC (57) ABSTRACT

An image combining apparatus, which is connected with a white-board device, and an image projecting device, includes an image outputting section for outputting the projective image data to the image projecting device, an operation section for designating any position on a projected image, an image processing section for generating projective image data for displaying a mark, a memory section for memorizing the coordinate positions of two or more standard points, and an image inputting section for receiving the scanned image data from the white-board device, wherein the image processing section obtains the coordinate positions of the certain marks when the two or more standard points have been designated, the image processing section makes correspondence with the coordinate positions of the certain marks and the coordinate positions of the two or more standard points respectively, whereby the image processing position recognizes the position of the projected image on the viewing surface.

11 Claims, 10 Drawing Sheets

ALARM SCREEN

FIG. 20

IMAGE COMBINING APPARATUS AND METHOD FOR ALIGNING POSITIONS OF IMAGES

CROSS REFERENCE TO RELATED APPLICATION

This application is based on Japanese Patent Application No. 2010-030034 filed on Feb. 15, 2010 with the Japanese Patent Office, the entire content of which is hereby incorporated by reference.

TECHNICAL FIELD

The present invention relates to an image combining apparatus and a method for aligning positions of images, and in particular, to an image combining apparatus which combines data of projected image on a viewing surface, with data of scanned image being read data of the images depicted on the viewing surface, and to a method for aligning the projected image and the scanned image.

BACKGROUND ART

In recent years, users generally use image projecting device and white-board devices for meetings, and they write outcome of the meeting on a viewing surface of a white-board device on which an image has been displayed via an image projecting device. For such purposes, well known are products, which combine a projected image, projected by the image projecting device, with a scanned image on the viewing surface of the white-board device, and said products print out combined images, whereby various technologies have been disclosed for aligning the positions of the projected image and the scanned image.

For example, Unexamined Japanese Patent Application Publication 2001-16384 discloses a technology in which a position mark, projected by the image projecting device, is used for a positioning standard, being marked on the screen, concerning an apparatus for combining projected image data on an image projecting device, with the image data on a screen of an electronic viewing board.

Further, unexamined Japanese Patent Application Publication 9-51423 discloses technology in which an image applied to an overhead projector is marked on a screen as a positioning standard, concerning an apparatus for combining the projected image data on the overhead projector with the image data on the screen of an electronic viewing board.

Still further, Unexamined Japanese Patent Application Publication 9-51424 discloses technology in which light rays, existing on the side of projected images on an overhead projector, are detected by an optical sensor mounted on an electronic viewing board, so that the projected image data are aligned onto the screen of the electronic viewing board, concerning an apparatus for combining the projected image data on the overhead projector with image data on the screen of an electronic viewing board.

In order to combine the projected image data on the viewing surface, with the scanned image data being read data of the images depicted on the viewing surface, it is necessary to recognize the positional relationship between the scanned image and the projected image.

Accordingly, concerning the above unexamined Japanese Patent Application Publications 2001-16384 and 9-51423, a standard mark is identified by the scanned image data, being read by the image combining apparatus with respect to the image depicted on the viewing surface, so that the positional relationship between the scanned image and the projected image is recognized. However, according to this method, an image to show the standard position is projected from the image projection apparatus, so that a certain mark is projected onto the viewing surface, whereby pictorial figures, being similar to said certain mark, such as a round mark, cannot be used on the board, and if no mark has been applied, the image data cannot be combined, which are adverse matters.

Further, concerning the above unexamined Japanese Patent Application Publication 9-51424, since the positional alignment, between the projected image and the screen, is conducted while the optical sensor mounted on the electronic viewing board is used, a specific electronic viewing board, carrying an optical sensor, is required so that general versatility is very low, which results in an overall increase of system costs.

The present invention has been achieved to overcome the above problems. A main object is to offer an image combining apparatus, by which a positional relationship, between the projected image on the viewing surface and the scanned image being read data of the images depicted on the viewing surface, is easily recognized, so that positional alignment of the images is precisely carried out, and to offer a method for aligning the positions of images.

SUMMARY OF THE INVENTION

To achieve at least one of the abovementioned objects, an image combining apparatus reflecting one aspect of the present invention, an image combining apparatus, which is connected with a white-board device, which has a viewing surface and is configured to scan a depicted image depicted by a user on the viewing surface, and to output scanned image data, and an image projecting device, which is configured to project image data onto the viewing surface, based on projective image data, wherein the image combining apparatus, which is configured to combine the scanned image data of the depicted image with the projective image data, comprises:

an image outputting section for outputting the projective image data to the image projecting device;

an operation section for designating any position on a projected image;

an image processing section for generating projective image data for displaying a mark, having an image of a certain mark at a coordinate position corresponding to the position designated by the operation section, as the projective image data, so that the certain mark is displayed on the position designated by the operation section;

a memory section for memorizing the coordinate positions of two or more standard points determined on the viewing surface of the white-board device; and an image inputting section for receiving the scanned image data from the white-board device, wherein the image processing section is configured to obtain the coordinate positions of the certain marks when the two or more standard points have been designated, the image processing section is further configured to make correspondence with the coordinate positions of the certain marks and the coordinate positions of the two or more standard points respectively, whereby the image processing position recognizes the position of the projected image on the viewing surface of the white-board device.

Further, another aspect of the present invention is a method for aligning the positions of images for combining scanned image data of a depicted image, which are obtained after the depicted image has been scanned on a viewing surface of a white-board device, with projective image data of a projected image projected by an image projecting device onto the viewing surface of the white-board device,
wherein the method comprises:
  a first step for generating projective image data, having an image of a certain mark at a coordinate position corresponding to the position designated by the operation section, and for projecting an image onto the viewing surface of the white-board device by the image projecting device, so that the certain mark is displayed on the position designated by the operation section;
  a second step for obtaining the coordinate positions of the aligning marks, with respect to two or more standard points, designated by the operation section on the viewing surface of the white-board device; and
  a third step for corresponding the coordinate positions of the certain marks with the coordinate positions of the two or more standard points stored previously, and for recognizing the position of the projected image on the viewing surface of the white-board device.

According to the image combining apparatus and the image positioning method of the present invention, the relationship between the position of projected image on the viewing surface, and the position of scanned image, being read data of the image depicted on the viewing surface, is easily recognized so that both images can be precisely combined.

Because, concerning the apparatus for combining the data of projected mage and the data of scanned image, in order to display a position pointing mark on a position, instructed on the projected image, data of the projected image are generated, which include the position pointing mark at the coordinate position, corresponding to the designated position, the image is projected onto the viewing surface by the image projecting device, based on the data of the projection image, a coordinate position of the position pointing mark is obtained, when the operating section designates the predetermined standard point on the viewing surface, whereby the coordinate position of the position pointing mark and the coordinate position of the standard point on the viewing surface are corresponded with each other, so that the position of projected image is recognized on the viewing surface.

BRIEF DESCRIPTIONS OF THE DRAWINGS

Embodiments will now be detailed, by way of example only, with reference to the accompanying drawings which are meant to be exemplary, not limiting, and wherein like embodiments are numbered alike in the several figures, in which.

DETAILED DESCRIPTIONS OF THE PREFERRED EMBODIMENTS

According to recent technologies, as detailed in the background art, the image is projected onto the viewing surface by an image projection device, such as an image projecting device. Further, another image is depicted on the viewing surface by a user, and said depicted images are scanned by the scanner of the white-board device. The data of the projected image (hereinafter, referred to as "projective image data") and the data of the scanned image (hereinafter, referred to as "scanned image data") are combined with each other. In order to precisely combine both sets of data, it is necessary to recognize the positional relationship between the projected image and the scanned image.

However, according to that method, in which an image to show a standard position is projected by the image projection device so that the mark is applied on the board, as disclosed in Unexamined Japanese Patent Application Publications 2001-16384, and 9-51423, the method inhibits the user to depict a figure which is similar to the mark, and the images cannot be combined without the mark. Further, according to that method, in which the light sensor, provided on the electronic viewing board, is used for aligning the positions, as disclosed in Unexamined Japanese Patent Application Publication 9-51424, the specific electronic viewing board, carrying the light sensor, is necessary, which is liable to increase the price of the total system.

To overcome the above problems, in the embodiment of the present invention, the apparatus to combine the images is structured in such ways that: in order to display the position pointing mark at the instructed position on the projected image, data of the projected image is generated, which include the position pointing mark at the coordinate position, corresponding to the designated position, the image is projected onto the viewing surface, a coordinate position of the position pointing mark is obtained, when the operation section designates the predetermined standard point on the viewing surface, whereby the coordinate position of the position pointing mark and the coordinate position of the standard point on the viewing surface are coordinated with each other, so that the position of the projected image is recognized on the viewing surface.

According to the above structure, it is not necessary for the user to make the mark on the viewing surface, based on the projected image. Further, the user can write any characters or figures on the viewing surface, which enhances convenience for the user. Still further no specific electronic viewing board is necessary, so that the positional alignment of the images can be conducted on a system exhibiting a low production price. Still further, if the projected image only partially overlaps on the viewing surface, the positional alignment can be conducted by this method. Accordingly, when plural images are projected onto a single viewing surface by plural image projecting devices, or when plural images are projected onto plural viewing surfaces, this method can also be utilized, so that general versatility of the system is increased.

EMBODIMENTS

In order to more fully detail the embodiment of the present invention, the positional alignment method of the image combining apparatus, and the positional alignment method of the images, relating to the embodiment of the present invention, will now be explained, while referring to FIGS. 1-20.

Figure 1:
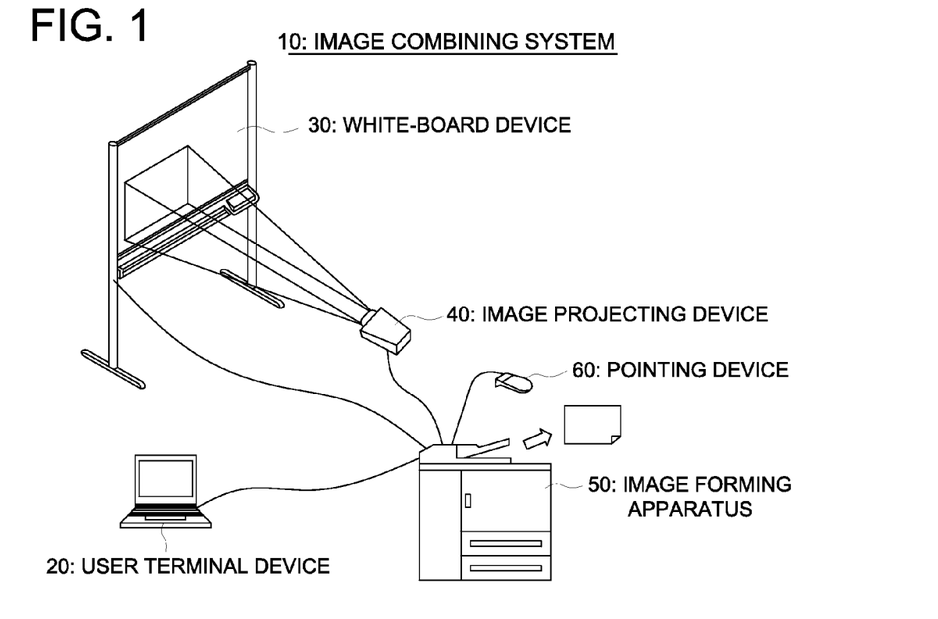
FIG. 1 shows a schematic structure of the image combining system relating to an embodiment of the present invention.
Figure 2:
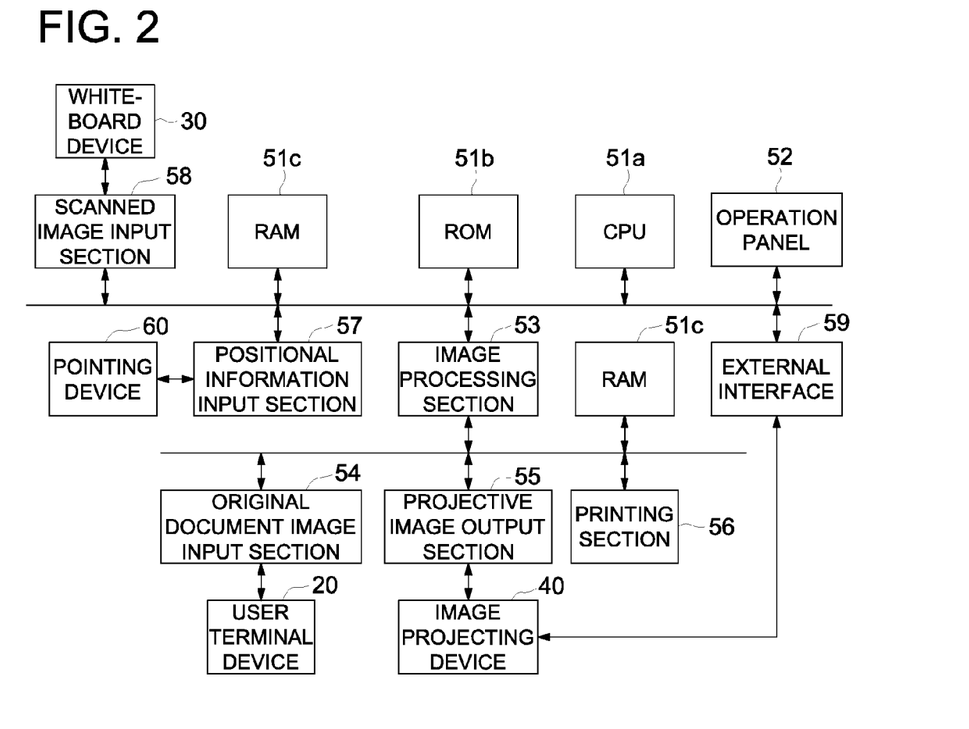
FIG. 2 is a block diagram of an image forming apparatus relating to an embodiment of the present invention.
Figure 3:
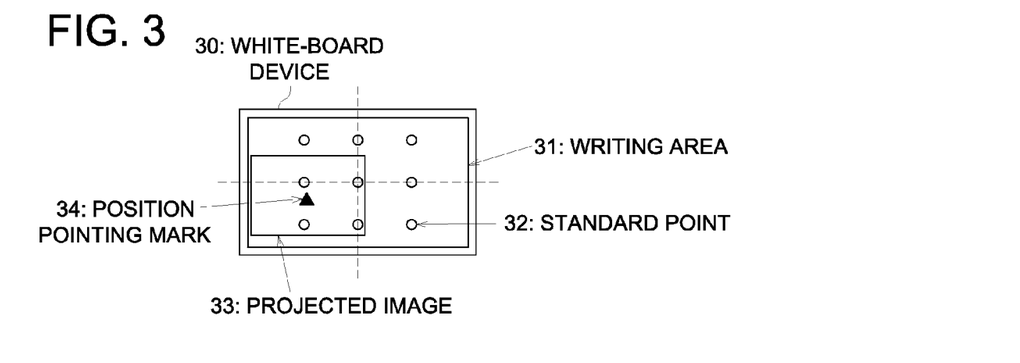
FIG. 3 shows a projected image projected onto a viewing surface.
Figure 4:
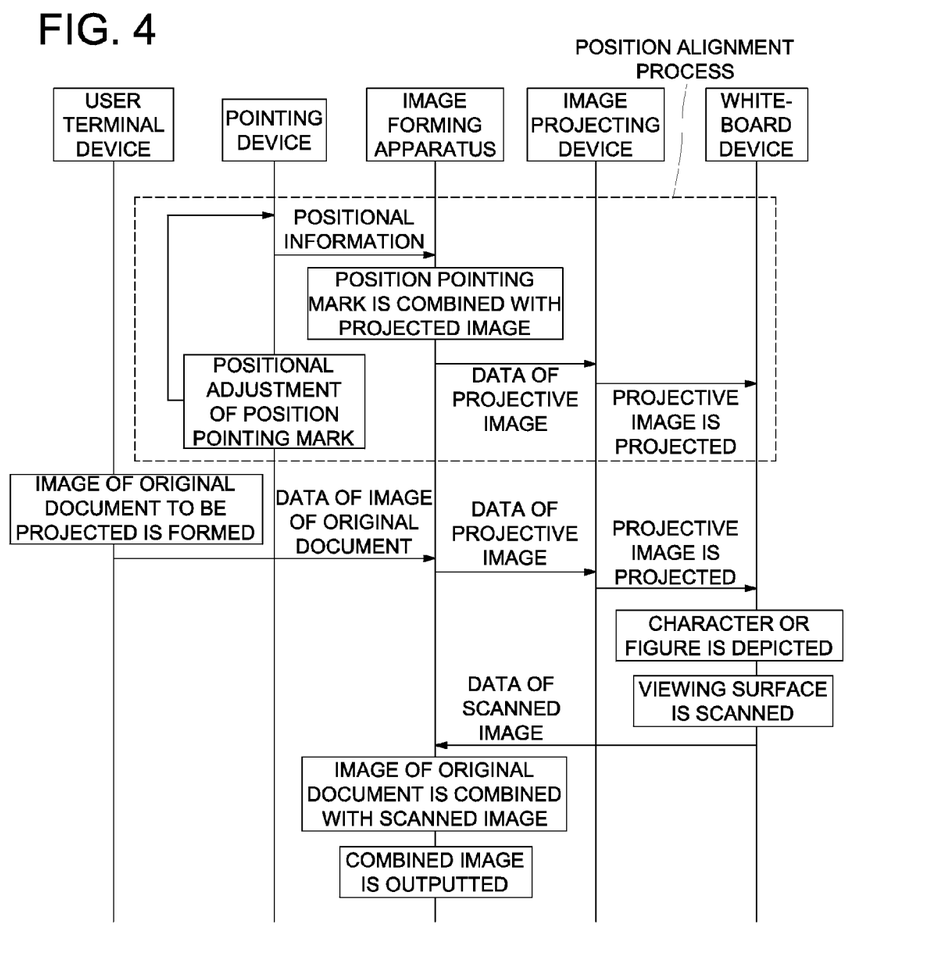
FIG. 4 is a sequence chart to show the total operation of the image combining system relating to an embodiment of the present invention.
Figure 5:
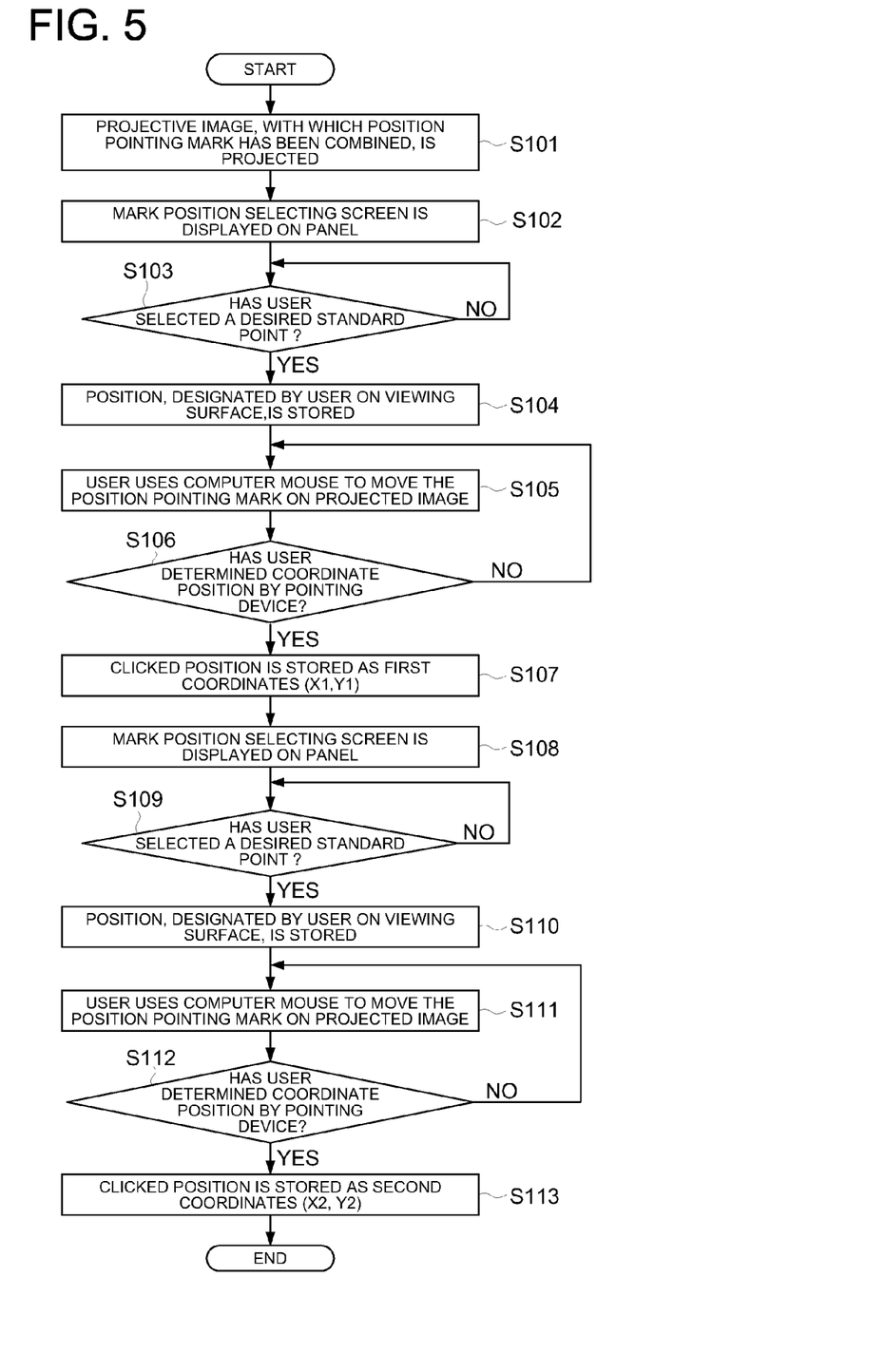
FIG. 5 is a flow chart to show the operation of the image forming apparatus relating to the present invention.
Figure 6A:
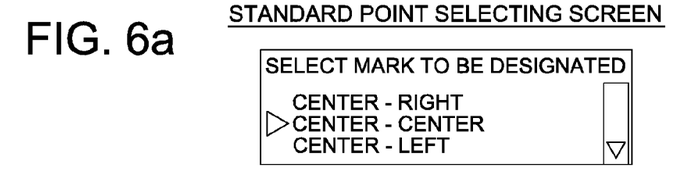
FIGS. 6a and 6b show an example of aligning a position pointing mark onto a standard point located on a center of the viewing surface.
Figure 6B:
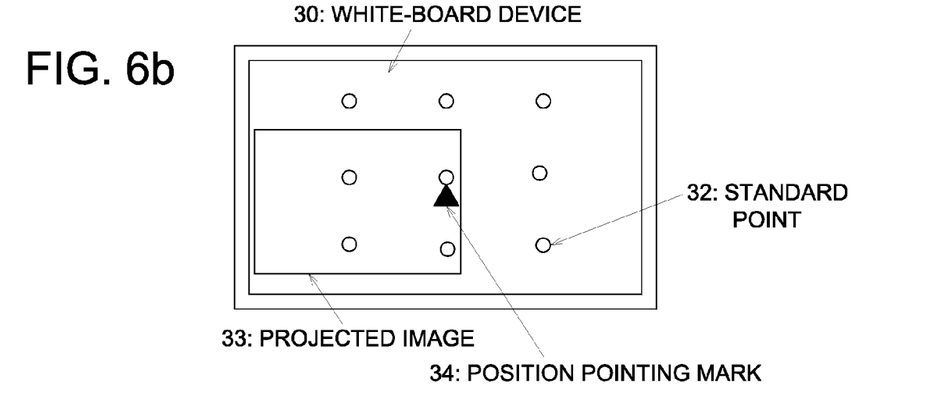
Figure 7A:
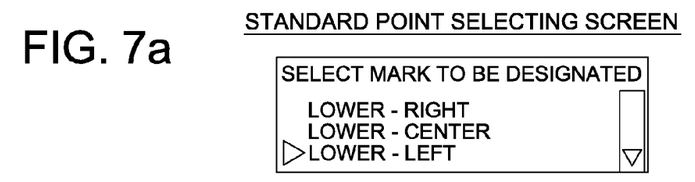
FIGS. 7a and 7b show an example to align the position pointing mark onto the standard point located on the lower left of the viewing surface.
Figure 7B:
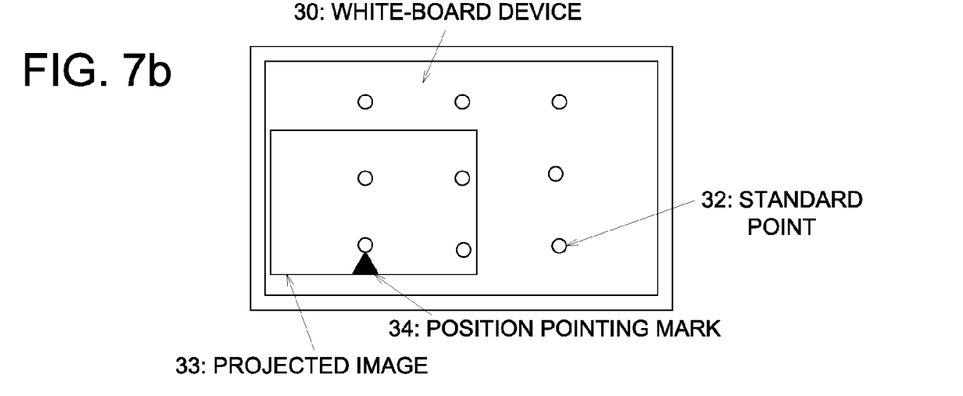
Figure 8:
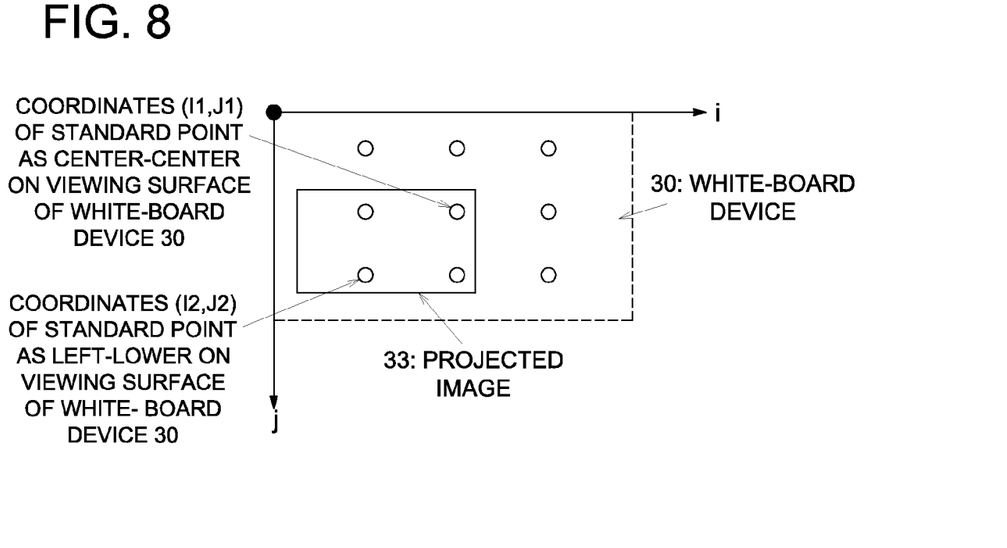
FIG. 8 shows the coordinate of the standard point on the viewing surface.
Figure 9A:
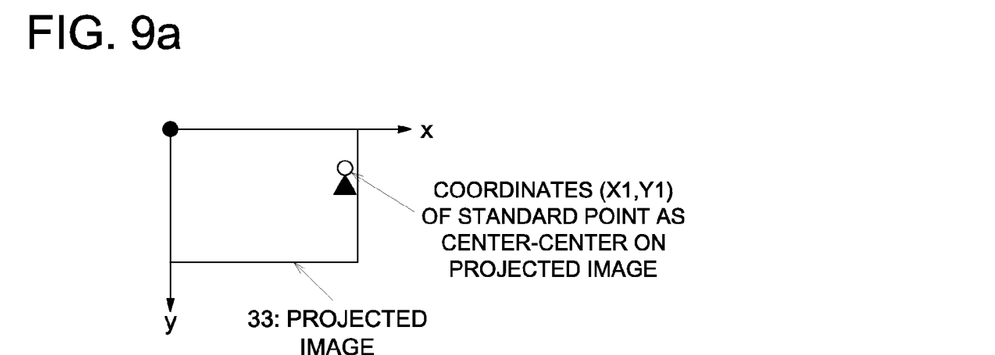
FIGS. 9a and 9b show the coordinate of the position pointing mark on the projected image.
Figure 9B:
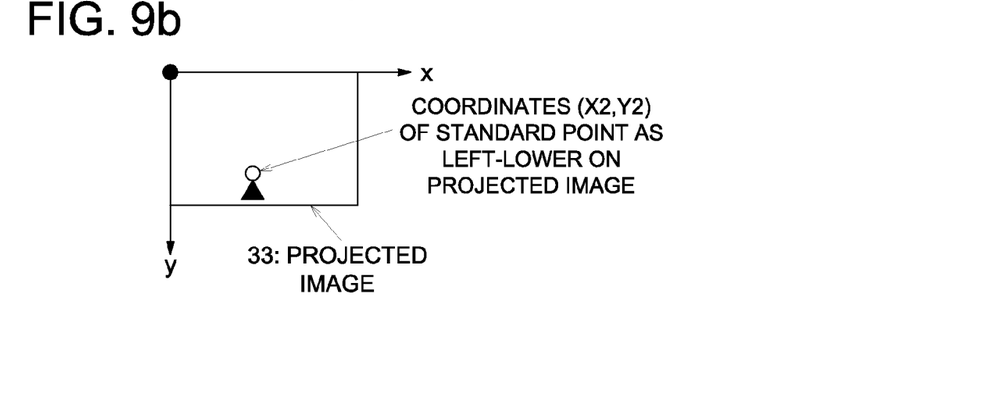

FIG. 1 shows a schematic structure of the image combining system relating to the embodiment of the present invention, FIG. 2 is a block diagram of the image forming apparatus, FIG. 3 shows the positional relationship between the projected image and the viewing surface of the white-board device, FIG. 4 is a sequence chart to show the total operation of the image combination, FIG. 5 is a flow chart to show the operation of the image forming apparatus, FIGS. 6 and 7 show an example of aligning the position pointing mark onto a standard point, FIGS. 8 and 9 show the coordinate of the standard point, and the coordinate of the position pointing mark, and FIGS. 10-20 show variations of the present embodiment.

In FIG. 1, image combining system 10 is structured of user terminal device 20, white-board device 30, image projecting device 40 for projecting the image on white-board device 30, image combining apparatus 50 including a function to print out combined images, wherein image combining apparatus 50 is configured to combine the data of a projected image and the data of a scanned image of the image depicted on the viewing surface of white-board device 30, and pointing device 60 for designating the position of the position pointing mark, such as an arrow, which is used for the positional alignment. Each device will now be detailed below.

[User Terminal Device]

User terminal device 20 is structured of a control section, a display section, an operation section, a communicating section, and the like. The control section, structured of a CPU and memory devices, such as ROM, RAM and the like, totally controls the operation of user terminal device 20, the control section generates image data of an original document image to be projected onto white-board device 30. The display section, structured of a liquid crystal display, and the like, displays a screen for making the original document, or the like.

The operation section, structured of a key board, a computer mouse and the like, makes it possible to conduct various operations for making the original document. The communicating section, structured of a network interface card, a modem, or the like, communicates with image forming apparatus 50.

[White-Board Device]

White-board device 30 is structured of a viewing surface, a control section, a scanning section, a communicating section, or the like. The control section controls the total operations to be conducted by white-board device 30. The scanning section scans the images of characters or figures, depicted by the user with a felt pen, or the like, on the viewing surface, and generates scanned image data. The communicating section conducts the electronic communication with image forming apparatus 50, to output the scanned image data, generated by the scanning section, to image forming apparatus 50.

[Image Projecting Device]

Image projecting device 40 is structured of a control section, an optical output section, a communicating section, or the like. The control section controls the total operations to be conducted by image projecting device 40. The optical output section projects an image onto the viewing surface of white-board device 30, based on projected image data, sent from image forming apparatus 50. The communicating section conducts the electronic communication with image forming apparatus 50.

Image forming apparatus 50 is structured of a control section, a display operation section (being operation panel 52), image processing section 53, original document image input section 54, projection image output section 55, printing section 56, positional information input section 57, scanned image input section 58, external interface 59, or the like.

In FIG. 2, the control section is structured of CPU 51a, memory devices, such as ROM 51b, RAM 51c, or the like, and a hard disk drive (being HDD) as necessary, which is not illustrated. CPU 51a copies control programs stored in ROM 51b, onto RAM 51c, and conducts various controls, based on the control programs on RAM 51c. RAM 51c stores the control programs, and serves as a temporary storage section of the original document image data, sent from user terminal device 20, and various calculated values for positional alignment. ROM 51b and HDD stores the coordinate position of a standard point, determined in advance on the viewing surface of white-board device 30. Concerning the coordinate position of the standard point, under the condition that image forming apparatus 50 has been connected with white-board device 30, scanned image input section 58 scans the standard point, provided on the viewing surface of white-board device 30, and obtains the scanned image data. Subsequently, the control section analyzes said scanned image data, whereby the coordinate position of the standard point is obtained.

Display operation section (being operation panel 52) includes a pressure-sensitive touch panel, in which transparent electrodes are arranged in a reticular pattern, which is mounted on a display section, such as a liquid crystal display. The pressure-sensitive touch panel displays various operation buttons, conditions of the apparatus, and operating conditions of various functions, in accordance with display signals, which are sent from the control section. Further, when a point on the pressure-sensitive touch panel is touched by a finger or a touch-pen, the XY-coordinates of the touched point is detected as an electric voltage, whereby the detected voltage exhibiting the touched point is outputted to the control section as an operation signal. In the present structure, display operation section 52 includes a display section and an operation section, both united with each other. However, an operation section, in which various operating buttons are arranged, and a display section, which is separated from the operation section, can also be used.

Image processing section 53 generates the projected image data, which carries an image of the position pointing mark, at the pointed coordinate position, so that the position pointing mark, such as an arrow, can be displayed at the position, pointed within the projected image. Further, image processing section 53 detects the position of the projected image on the viewing surface of white-board device 30. Subsequently, based on the above detected result, image processing section 53 combines the original document image data, which has been generated by user terminal device 20, with the scanned data of the depicted image onto the viewing surface of white-board device 30.

Original document input section 54 obtains the image data of the original document image, from user terminal device 20.

Projection image output section 55 outputs the projected image data carrying the position pointing mark, and the projected image data carrying the original document image, onto image projecting device 40.

Printing section 56 is structured of an electrical charging section, a photosensitive drum, an exposure device, a transfer roller, a transfer belt, and a fixing device, wherein these sections and devices are necessary for forming the image, in which an image forming process, such as an electro-photographic method or an electrostatic recording method, is used. In detail, after the photosensitive drum is electrically charged by the charging device, the light rays are radiated onto the photosensitive drum from the exposure device in accordance with printing data, so that an electrostatic latent image is generated on the photosensitive drum. Subsequently, charged toner particles are applied onto the photosensitive drum by the developing device, whereby a toner image is generated. After that, the toner image is transferred onto a media sheet via a primary transfer roller and a secondary transfer belt, and the toner image is permanently fixed by the fixing device on the media sheet.

Positional information input section 57 obtains positional information which designates a position of the position pointing mark, from pointing device 60.

Scanned image input section 58 obtains the scanned image data from white-board device 30.

External interface 59, structured of a network interface card and a modem, conducts electronic communication with user terminal device 20, white-board device 30, image projecting device 40, and pointing device 60.

Image processing section 53, original document image input section 54, projection image output section 55, positional information input section 57, and scanned image input section 58 can be formed via hardware, or control programs to conduct the functions of those sections in the control section.

[Pointing Device]

Pointing device 60, structured of a computer mouse, or the like, outputs positional information to designate a position of the position pointing mark.

In addition, FIGS. 1 and 2 show an example of image combining system 10 of the present embodiment, the structure of which can be changed if appropriate. For example, in FIGS. 1 and 2, image forming apparatus 50 is structured to conduct the positional alignment and the combination of the projected image and the scanned image. However, as another structure, a computer terminal device can be structured to conduct the positional alignment and the combination of the projected image and the scanned image, whereby the image data of the combined images is outputted to image forming apparatus 50. Further, as yet another structure, image projecting device 40 can be structured to conduct the positional alignment and the combination function, and image forming apparatus 50 can be structured to have the function of image projecting device 40.

Still further, in the structure shown FIGS. 1 and 2, pointing device 60 is separated from image forming apparatus 50. However, as yet another structure, it is also possible to designate a position of the position pointing mark through the display operation section (being operation panel 52) of image forming apparatus 50, in which case, pointing device 60 is not necessary. Further, in the structures shown FIGS. 1 and 2, the image data of the original document is inputted from user terminal device 20. However, as another structure, it is also possible to provide a scanner section in image forming apparatus 50. After the image data of the original document is scanned by said scanner section, the scanned image data can be projected onto the viewing surface of white-board 30, in which case, user terminal device 20 is not necessary.

The operation of image combining system 10 having the above detailed structure will now be explained, while using the sequence chart shown in FIG. 4.

Firstly, the user instructs a position pointing operation through operation panel 52 of image forming apparatus 50. Image forming apparatus 50 obtains positional information from pointing device 60. In order to display the position pointing mark at the position which is designated by pointing device 60, image forming apparatus 50 generates projected image data, carrying the position pointing mark at the coordinate position corresponding to the pointed position, and sends the projected image data to image projecting device 40. In this case, the projected image data includes only image data of the position pointing mark, or includes the image data of a predetermined image, carrying the position pointing mark. Image projecting device 40 projects the image onto the viewing surface of white-board device 30, based on the projected image data.

FIG. 3 shows the image projected onto the viewing surface of white-board device 30. Plural standard points are provided, in advance, on the viewing surface of white-board device 30, and projected image 33 carries position pointing mark 34 at the coordinate position, corresponding to the position designated by positional information. In FIG. 3, standard point 32 is shown by 3 rows, and 3 columns, but at least two standard points 32 are preferably included within projected image 33, and their arrangements and numbers can be changed, as appropriate. Further, plural standard points 32 are written on the viewing surface of white-board device 30, which are arranged on a grid. Still further, standard points 32 are shown by round marks, and the position pointing mark is shown by a triangle, but these sizes and figures can be changed, if desired.

The user checks the position of standard point 32 and the position of position pointing mark 34 of projected image 33, on the viewing surface of white-board device 30. The user then uses pointing device 60 to move position pointing mark 34, so that position pointing mark 34 is aligned to overlap on standard point 32, which aligning operation is repeated, until point 32 and mark 34 are completely overlapped. This operation will be detailed later.

After that, the user operates user terminal device 20 to make an original document. User terminal device 20 is then controlled to send image data of the original document, to image forming apparatus 50. Original document image input section 54 of image forming apparatus 50 receives the image data of the original document. If necessary, image processing section 53 conducts an image processing operation to form projective image data, and said projective image data is sent to image projecting device 40. Image projecting device 40 receives the projective image data, and projects it onto the viewing surface of white-board device 30.

In the above explanation, image forming apparatus 50 forms the projective image data, while using the image data of the original document. However, if the image processing operation is not needed for the image data of the original document, the image data of the original document can be sent to image projecting device 40, as the projective image data, while the image processing operation is not conducted. Otherwise, the image data of the original document can be sent directly from user terminal device 20 to image projecting device 40, as the projective image data.

After that, the user uses a felt pen, or the like, to write outcome of the meeting, or the like, at any position on the viewing surface of white-board device 30. In this case, the user can write the outcome of the meeting to overlap on the projected image, or not to overlap on the projected image. Subsequently, the user uses a print start button or a remote control device, mounted on white-board device 30, to start the scanning operation on the viewing surface. That is, white-board device 30 starts the scanning operation, to read the image depicted on the viewing surface, and generates scanned image data. Subsequently, white-board device 30 sends the scanned image data to image forming apparatus 50.

After that, image processing section 53 of image forming apparatus 50 combines the image data of the original document, which has been sent from user terminal device 20, with the scanned image data, which has been sent from white-board device 30, based on the result of the position alignment operation, which was previously conducted, whereby image processing section 53 generates combined image data, which is outputted to printing section 56.

According to the above-described procedure, after the position alignment operation has been completed, the original document image is projected onto the viewing surface of white-board device 30. However, it is possible to use another method, in which, while the original document image is projected onto the viewing surface of white-board device 30, the position pointing mark is displayed on the original document image, the position alignment operation is then conducted.

The procedure of the position alignment of the projected image and the scanned image will now be detailed, while referring to the flow chart shown in FIG. 5, FIGS. 6a and 6b, and FIGS. 7a and 7b.

Firstly, in order to display position pointing mark 34 on the projected image, image forming apparatus 50 generates projective image data, including the image of position pointing mark 34, on the coordinate position which corresponds to the position, pointed out by pointing device 60. Then, image forming apparatus 50 sends said projective image data, to image projecting device 40, so that an image is projected as projected image 33 on the viewing surface of white-board device 30, based on the projective image data (see step S101 of FIG. 5).

After that, the user uses operation panel 52 to instruct the position alignment operation. Image forming apparatus 50 is controlled to display a standard point selecting screen (step S102), through which the user selects standard point 32 existing on a desired position, among plural standard points 32, whereby position pointing mark 34 is aligned on desired standard point 32. Said standard point selecting screen is structured as shown in FIG. 6a, for example, so that standard points 32, provided on the viewing surface of white-board device 30, can be displayed, one of which is selected by the user.

Subsequently, the user operates operation panel 52, to select a desired standard point. In this case, the user selects a standard point, representing "center-center" (YES of step S103). Image forming apparatus 50 is controlled to read out the coordinates of selected standard point 32 from ROM 52b or HDD, and said coordinates are memorized in RAM 51c (step S104).

Subsequently, the user operates pointing device 60 to shift position pointing mark 34 to standard point 32 representing "center-center" as shown in FIG. 6b (step S105). In detail, in step S101, in case that position pointing mark 34 exists on the center of projected image 33, the user operates pointing device 60 to shift position pointing mark 34 to the right. Pointing device 60 sends positional information to image forming apparatus 50. Image processing section 53 of image forming apparatus 50 generates projective image data, carrying position pointing mark 34 on the coordinate position corresponding to the position designated by positional information, and image processing section 53 sends the projective image data to image projecting device 40. Image projecting device 40 displays the image on the viewing surface of white-board device 30, based on the projective image data.

Subsequently, the user checks position pointing mark 34 on the viewing surface of white-board device 30, if position pointing mark 34 aligns with standard point 32, representing "center-center", the user operates pointing device 60 (being a clicking operation, for example), to confirm the coordinate position of position pointing mark 34 (YES of step S106). If position pointing mark 34 does not align with standard point 32, representing "center-center" (NO of step S106), the operation flow goes back to step S105, so that the user operates pointing device 60 again, and repeats the procedure described above.

After that, image forming apparatus 50 is controlled to memorize the clicked position, as the position (being a first coordinate position) of standard point 32, representing "center-center" in RAM 51c (step S107).

Subsequently, image forming apparatus 50 is controlled to display the standard point selecting screen (see FIG. 7a) on operation panel 52, so that the user selects another standard point 32 on which position pointing mark 34 is aligned (step S108).

Subsequently, the user operates operation panel 52, to select a desired standard point. In this case, the user selects a standard point, representing "lower-left" (YES of step S109). Image forming apparatus 50 is controlled to read out the coordinates of selected standard point 32 from ROM 52b or HDD, and said coordinates are memorized in RAM 51c (step S110).

Subsequently, the user operates pointing device 60 to shift position pointing mark 34 to standard point 32 representing "lower-left" as shown in FIG. 7b (step S111). In detail, in step S105, in case that position pointing mark 34 exists on the right of projected image 33, the user operates pointing device 60 to shift position pointing mark 34 to the lower left. Pointing device 60 sends positional information to image forming apparatus 50. Image processing section 53 of image forming apparatus 50 generates projective image data, carrying position pointing mark 34 on the coordinate position corresponding to the position designated by positional information, and image processing section 53 sends the projective image data to image projecting device 40. Image projecting device 40 displays the image on the viewing surface of white-board device 30, based on the projective image data.

Subsequently, the user checks position pointing mark 34 on the viewing surface of white-board device 30, when position pointing mark 34 has aligned with standard point 32, representing "lower-left", the user operates pointing device 60 (being a clicking operation, for example), to confirm the coordinate position of position pointing mark 34 (YES of step S112). If position pointing mark 34 does not align with standard point 32, representing "center-center" (NO of step S112), the operation flow goes back to step S111, so that the user operates pointing device 60 again, and repeats the procedure described above.

After that, image forming apparatus 50 is controlled to memorize the clicked position, as the position (being a second coordinate position) of standard point 32, representing "lower-left", in RAM 51c (step S107).

The procedure of the position alignment of the projected image and the scanned image, in which two coordinates, memorized by the above-described procedure, are used, will now be detailed, while referring to FIG. 8, and FIGS. 9a and 9b.

FIG. 8 shows the coordinate positions on the viewing surface of white-board device 30, concerning standard points 32 of "center-center" and "lower-left". Said coordinate positions represent the coordinates, memorized in RAM 51c in steps S104 and S110 of flowchart in FIG. 5.

FIG. 9a shows the coordinate position on the projected image of standard point 32, representing "center-center", (that is the coordinate position, which is determined, after position pointing mark 34 has been overlapped on standard point 32, representing "center-center"). While, FIG. 9b shows the coordinate position on the projected image of standard point 32, representing "lower-left", (that is the coordinate position, which is determined, after position pointing mark 34 has been overlapped onto standard point 32, representing "lower-left"). Said coordinate positions represent the coordinates, memorized in RAM 51c in steps S107 and S113 of flowchart in FIG. 5.

Where, coordinates $(X1, Y1)$=coordinates $(I1, J1)$ coordinates $(X2, Y2)$=coordinates $(I2, J2)$ lateral magnification $h=|I1-I2|/|X1-X2|$ depth magnification $k=|J1-J2|/|Y1-Y2|$ Concerning original position (X0, Y0) of the projected image, its coordinate value on the viewing surface of whiteboard 30 can be determined by the following formulas, $X0=I1-h\times X1$ $Y0=J1-k\times Y1$ Since origin (X0, Y0) and the magnification are calculated by the above formulas, it is possible to precisely align the position of the scanned image and the position of the projected image. In addition, if two standard positions, which are aligned horizontally or vertically, are selected, the horizontal magnification or the vertical magnification cannot be calculated. To overcome this, standard points 32, which are not aligned horizontally or vertically, must be selected.

Accordingly, the projective image data, carrying position pointing mark 34 at the coordinate position corresponding to the position designated by pointing device 60, is generated. The coordinate position of position pointing mark 34, determined when standard positions 32, provided on the viewing surface in advance, have been designated, are obtained. Subsequently, the coordinate position of position pointing mark 34 is made to correspond with the coordinate positions of standard points 32, whereby the position of projected image 33 on the viewing surface of white-board device 30 can be recognized. That is, the projective image data and the scanned image data can be precisely combined.

The control operations, which are conducted in case that the standard point has been provided in advance on the viewing surface of white-board device 30, have been detailed above. However, in case that the standard point has not been provided in advance on the viewing surface of white-board device 30, the user can move the position pointing mark onto a position designated by image forming apparatus 50, whereby the position of projected image 33 on the viewing surface of white-board 30 can be recognized.

Figure 10A:
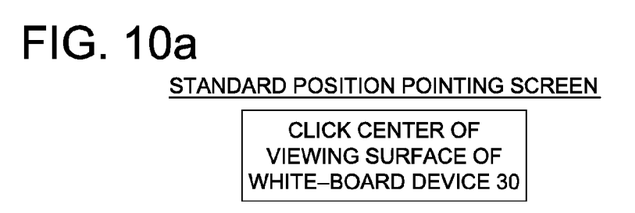
FIGS. 10a and 10b show an example to align the position pointing mark onto an instructed position (being the center of the viewing surface)
Figure 10B:
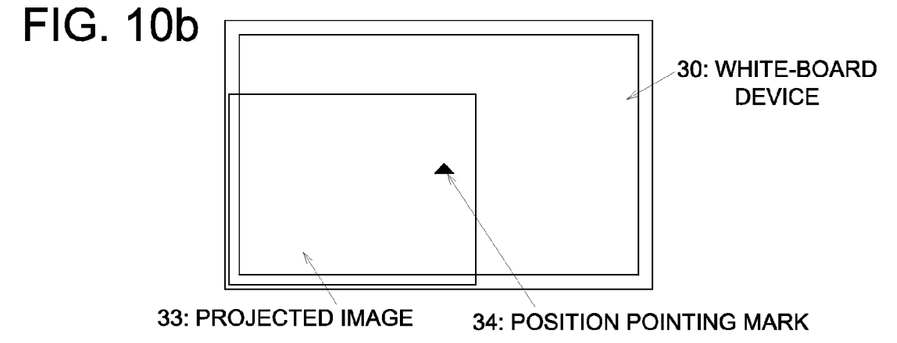
Figure 11A:
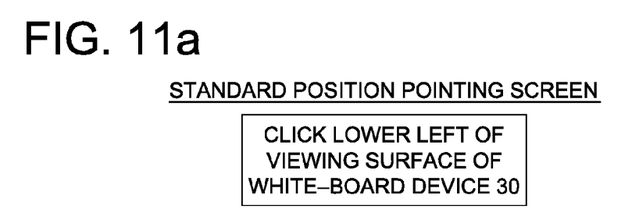
FIGS. 11a and 11b show an example to align the position pointing mark onto an instructed position (being the lower left of the viewing surface)
Figure 11B:
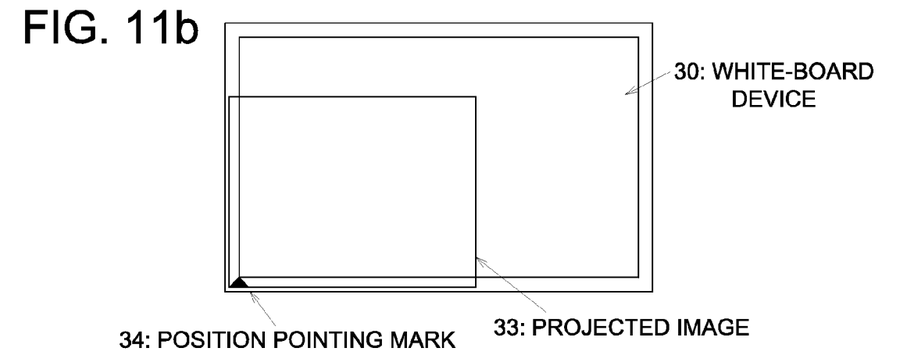

For example, in case that a standard position pointing screen is displayed as shown in FIG. 10a, the user operates pointing device 60, to shift position pointing mark 34 to the center of the viewing surface of white-board device 30, then the user conducts a clicking operation, as shown in FIG. 10b. In case that the standard position pointing screen is displayed as shown in FIG. 11a, the user operates pointing device 60, to shift position pointing mark 34 to the lower left of the viewing surface of white-board device 30, then the user conducts a clicking operation, as shown in FIG. 11b. Due to these operations, the position of projected image 33 on the viewing surface of white-board device 30 can be recognized. That is, the projective image data and the scanned image data can be precisely combined.

In addition, there is a case, in which position pointing mark 34 cannot be shifted to the position designated on the standard position pointing screen, based on the positions of projected image 33. In this case, after the user adjusts the position of projected image 33 again, the user conducts the position alignment, or the user preferably tries to display another screen for displaying other positions, such as at the upper left and at the lower center.

Figure 12:
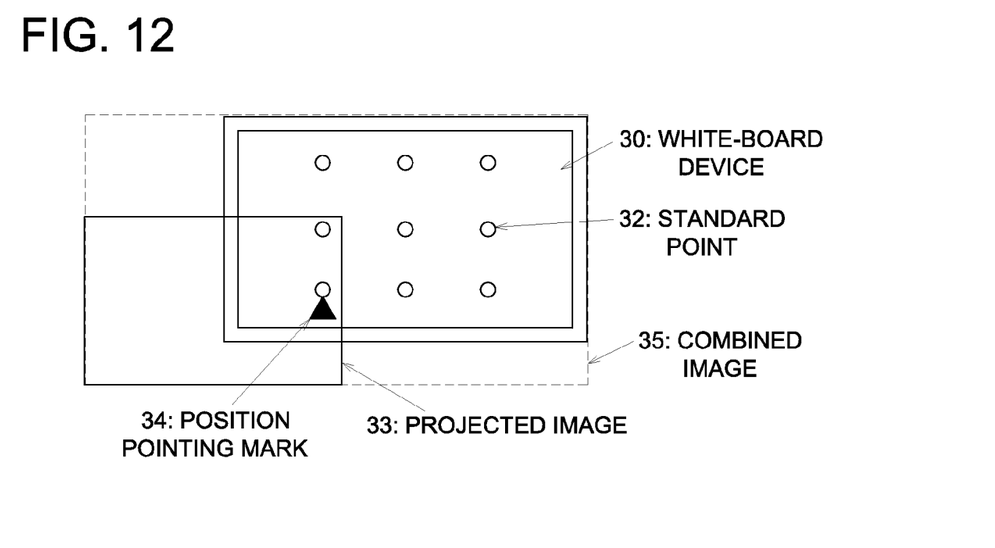
FIG. 12 shows an example in which the projected image is partially deviated from the viewing surface.

Further, depending on the installed position of image projecting device 40, projected image 33 may shift from the viewing surface of white-board device 30, as shown in FIG. 12. In this case, it is very difficult for the prior method to combine the images by writing four corners on the viewing surface. However, after the positions of two points have been designated within the projected image 33, the position of the projected image on the viewing surface of white-board device 30 can be recognized by the present embodiment.

In this case, the scope of the combined image may be determined to be equal to the scanning scope of white-board device 30. Further, as shown in FIG. 12, the scope of the combined image may be determined to be equal to the scope including the viewing surface and the projected image, or to be equal to the scope of the projected image.

In the above explanations, single image projecting device 40 is used for projecting the image onto a single viewing surface of white-board device 30. However, plural image projecting device 40 can be used for projecting the images on a single viewing surface (which is a multiple image projection method), or single image projecting device 40 can be used for projecting the images on plural viewing surfaces (which is a multiple-viewing surface method), which will now be detailed.

[Multiple Image Projection Method]

Figure 13:
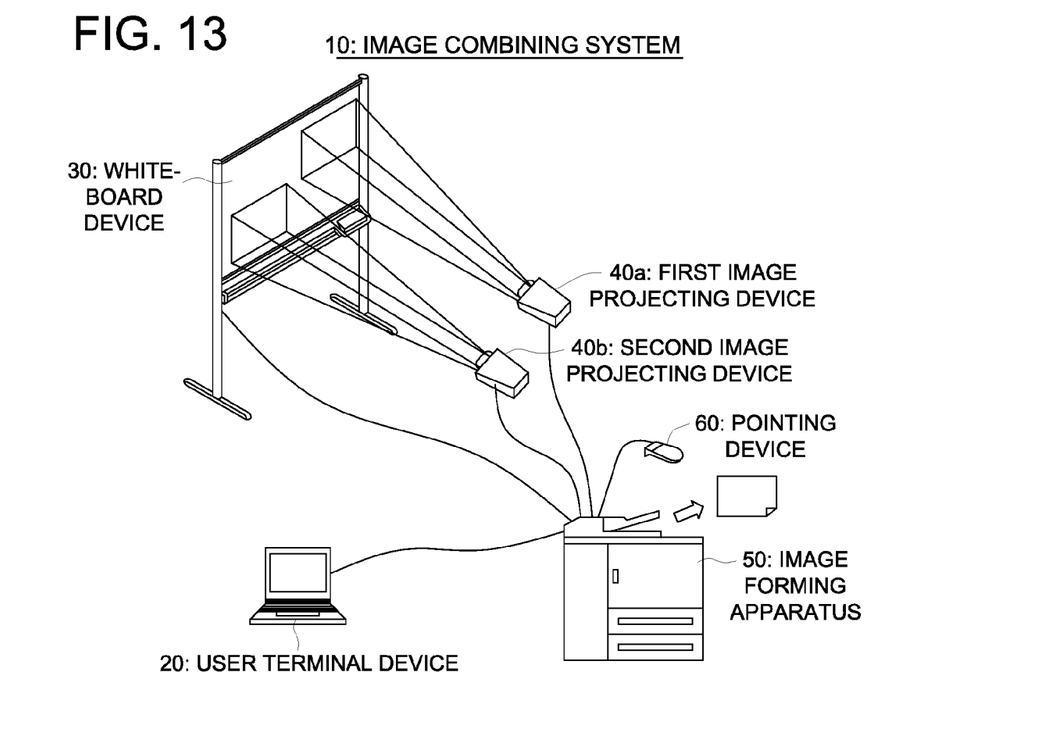
FIG. 13 shows another schematic structure (being multiple projections) of the image combining system relating to an embodiment of the present invention.
Figure 14:
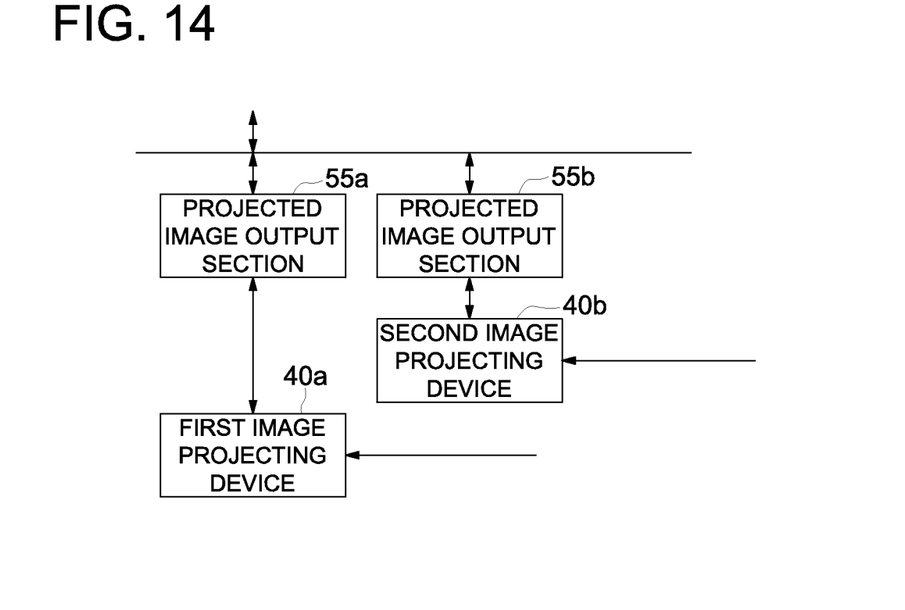
FIG. 14 is a block diagram of the image forming apparatus for the multiple projections, relating to an embodiment of the present invention.

FIG. 13 shows image combining system 10, using two image projecting devices (being first image projecting device 40a and second image projecting device 40b), to project the images onto the single viewing surface of white board device 30. As shown in FIG. 14, image forming apparatus 50 has two projection image output sections, whereby, first projection image output section 55a is connected to first image projecting device 40a, and second projection image output section 55b is connected to second image projecting device 40b.

Figure 15:
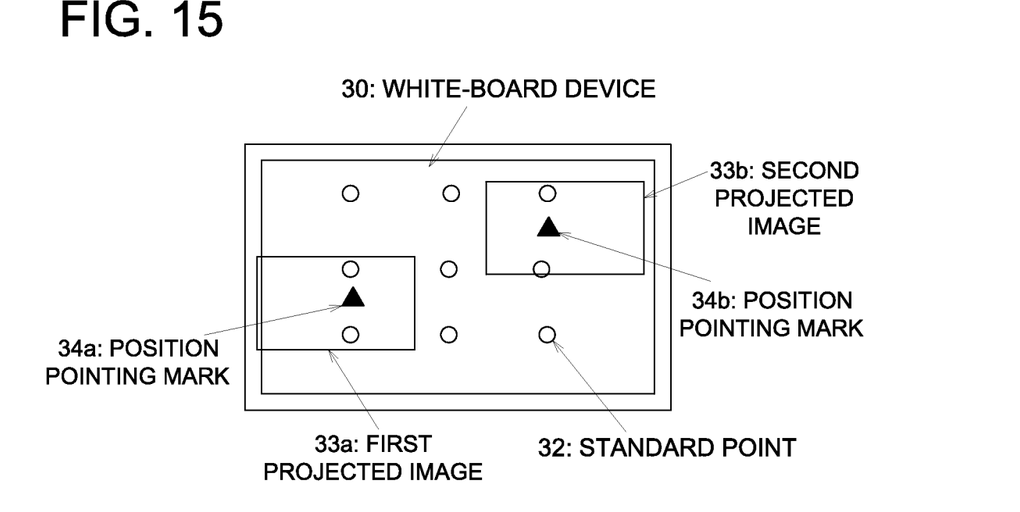
FIG. 15 shows an example in which plural images are projected onto the viewing surface.

In this structure, on the viewing surface of white-board device 30, first projected image 33a is projected by first image projecting device 40a, and second projected image 33b is projected by second projecting device 40b. For each projected image, position pointing marks 34a and 34b are adjusted to two standard points 32 by the procedures described above, whereby, the position of first projected image 33a and the position of second projected image 33b can be recognized on the viewing surface of white-board device 30.

Further, concerning the multiple-projection method, if no standard point is provided on the viewing surface of white-board device 30, when the positions, designated by image forming apparatus 50, are clicked, the positions of the projected images on the viewing surface of white-board device 30 can be recognized. Further, portions of one or both projected images are shifted from the viewing surface of white-board device 30, when the positions, designated by image forming apparatus 50, are clicked, the positions of the projected images on the viewing surface of white-board device 30 can be recognized.

[Multiple White-Board Devices Method]

Figure 16:
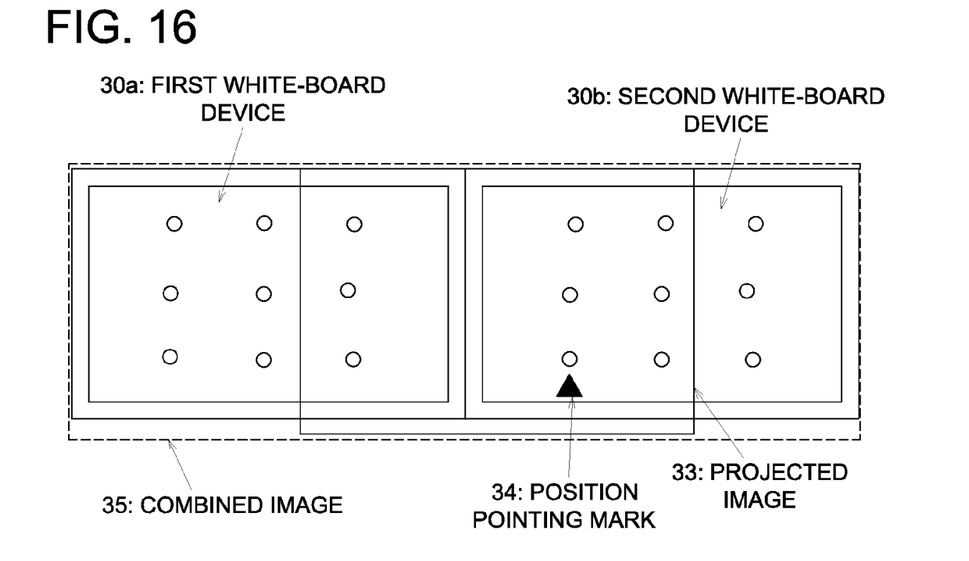
FIG. 16 shows an example in which an image is projected onto plural viewing surfaces.

FIG. 16 shows that a single image is projected onto plural viewing surfaces, (being the viewing surface of first white-board device 30a, and the viewing surface of second white-board device 30b). In this case, on each viewing surface, position pointing mark 34 is adjusted to two standard points 32 by the procedures described above, whereby, the position of projected image 33 on the viewing surface of first white-board device 30a can be recognized, and the position of projected image 33 on the viewing surface of second white-board device 30b can be recognized.

In this case, the scope of the combined images may be determined to be equal to the scanning scopes of the plural white-board devices. Further, as shown by the dashed line in FIG. 16, the scope of the combined images may determined to be equal to the scope including the viewing surfaces of the plural white-board devices, and the projected image, or the scope may be determined to be equal to the scope of the projected image.

Further, concerning the multiple white-board devices method, if no standard point is provided on the viewing surfaces of white-board devices 30, when the position, designated by image forming apparatus 50, is clicked, the position of the projected image on each viewing surface of white-board devices 30 can be recognized. Further, portions of one or both projected images are shifted from the viewing surfaces of white-board devices 30, when the position, designated by image forming apparatus 50, is clicked, the position of the projected image on the viewing surfaces of white-board devices 30 can be recognized.

The above explanations concern a case that the image can be projected on the total viewing surface of white-board device 30. However, if the characters or figures have already been depicted on the viewing surface, and if the image is also projected on it, the scanned image and the projected image are overlapped, which are not visible to the users. Though under this case, since the position of the projected image on the viewing surface of white-board-device 30 is definitive on the present systems, the image is controlled not to be projected onto an adverse position.

Figure 17:
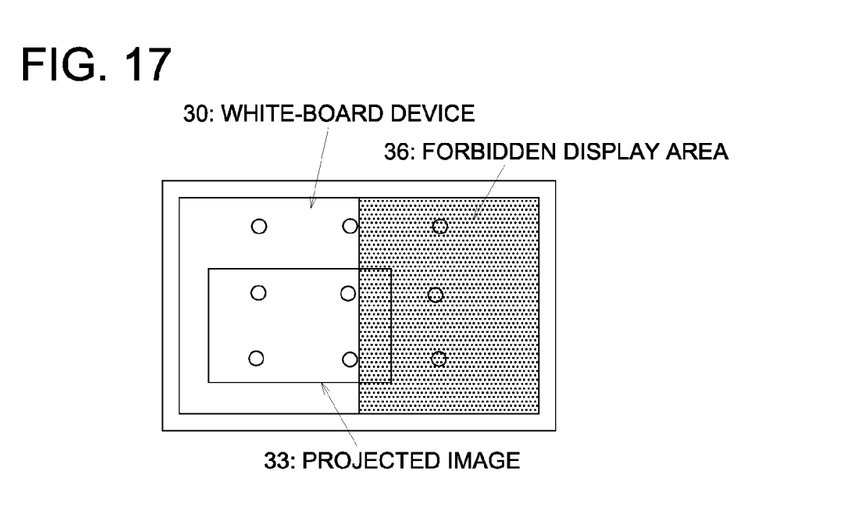
FIG. 17 shows an area where image display is forbidden on the viewing surface.
Figure 18:
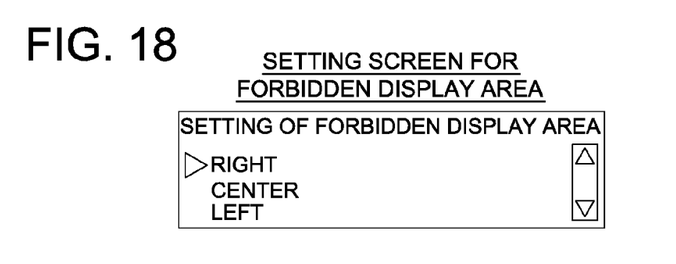
FIG. 18 shows an example of a screen to set forbidden display area.
Figure 19:
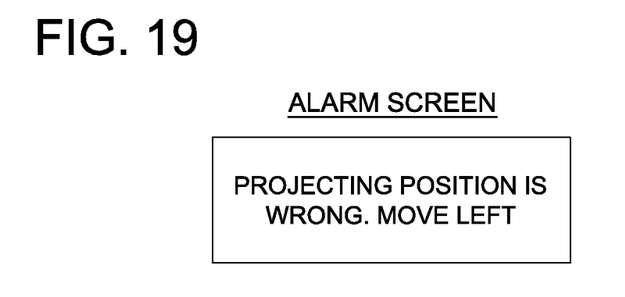
FIG. 19 shows an example of a warning screen to be displayed on the operation panel.

For example, as shown in FIG. 17, in order to set a predetermined area as forbidden display area 36, a screen shown in FIG. 18 is displayed on operation panel 52, and the user is requested to select forbidden display area 36. Subsequently, image forming apparatus 50 checks whether projected image 33 overlaps on forbidden display area 36, based on the position of the projected image on the viewing surface of white-board device 30. If it has overlapped, an alarm screen shown in FIG. 19 is displayed for the user.

Figure 20:
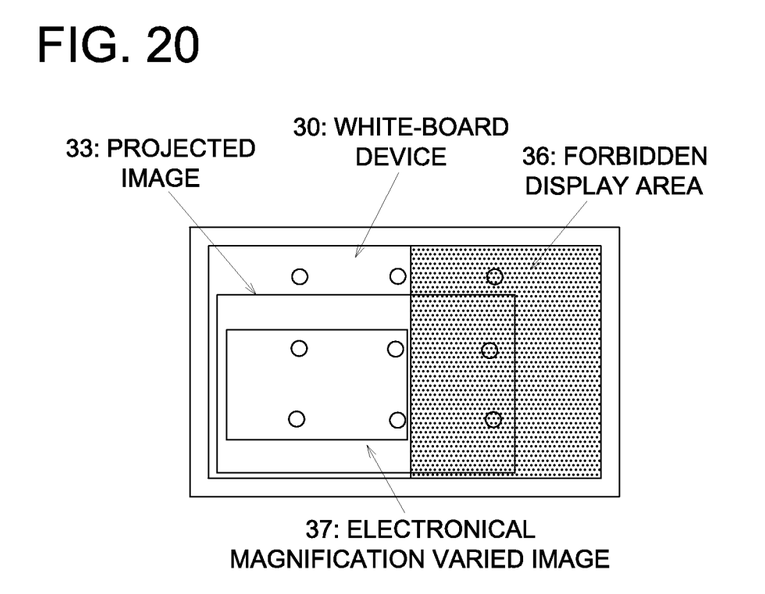
FIG. 20 shows an example for electronically changing the magnification of the projected image.

Further, projected image 33 has overlapped forbidden display area 36, as shown in FIG. 20, image processing device 53 is controlled to reduce projected image 33 to generate an image data, being an electronical magnification varied image, so that the projected image does not overlap on forbidden display area 36. Still further, if image projecting device 40 has been structured to include a control function, image projecting device 40 can control a projecting position, so that the projecting position is changed.

These detailed structures and operations of the image combining system relating to the present embodiment can be appropriately changed within the scope of this invention as long as they do not deviate from the content and scope of the present invention.

The present invention can be used for a system which includes a device to project an image, a device to carry out a scanning function, and a device to control the same.

What is claimed is:

1. An image combining apparatus, which is configured to be connected with a white-board device, which has a viewing surface and is configured to scan a depicted image depicted by a user on the viewing surface, and to output scanned image data, and an image projecting device, which is configured to project image data on the viewing surface, based on projective image data, wherein the image combining apparatus, which is configured to combine the scanned image data of the depicted image with the projective image data, comprises:

an image outputting section for outputting the projective image data to the image projecting device;

an operation section for designating a position on a projected image;

an image processing section for generating projective image data for displaying an image of a certain mark at a coordinate position corresponding to the position designated by the operation section so that the certain mark is displayed on the position designated by the operation section;

a memory section for memorizing coordinate positions of two or more standard points determined on the viewing surface of the white-board device; and an image inputting section for receiving the scanned image data from the white-board device, wherein the image processing section is configured to obtain the respective coordinate position of the certain mark when the certain mark is aligned with each of the coordinate positions of the standard points, the image processing section is further configured to make correspondence with the respective coordinate positions of the certain mark and the coordinate positions of the two or more standard points respectively, whereby the image processing position recognizes the position of the projected image on the viewing surface of the white-board device.

2. The image combining apparatus of claim 1, wherein the image processing section combines the scanned image data with the projective image data, based on the position of the projected image on the viewing surface of the white-board device.

3. The image combining apparatus of claim 2, wherein when the scanned image and the projected image are partially overlapped with each other, the images to be combined by the image processing section represent (1) images on an area including the whole of the scanned image and the whole of the projected image,
(2) images combining the scanned image with the partially overlapped portion of the projected image, or
(3) images combining the projected image with the partially overlapped portion of the scanned image.

4. The image combining apparatus of claim 1, wherein in case that a forbidden display area has been determined on the viewing surface, the image processing section judges whether the projected image overlaps on the forbidden display area, based on the position of the projected image on the viewing surface, and if the projected image overlaps on the forbidden display area, the image processing section alarms that the projected image overlaps on the forbidden display area, or
the image processing section reduces the projected image so that the projected image does not overlap on the forbidden display area.

5. The image combining apparatus of claim 1, wherein each of the standard points represent a written point arranged on a grid on the viewing surface of the white-board device.

6. A method for aligning positions of images for combining scanned image data of a depicted image, which are obtained after the depicted image has been scanned on a viewing surface of a white-board device, with projective image data of a projected image projected by an image projecting device onto the viewing surface of the white-board device,
the method comprises:
a first step for generating projective image data, having an image of a certain mark at a coordinate position corresponding to a designated position, and for projecting an image onto the viewing surface of the white-board device by the image projecting device, so that the certain mark is displayed on the designated position;
a second step for obtaining the coordinate position of the certain mark when the certain mark is aligned with each of two or more standard points on the viewing surface of the white-board device; and
a third step for corresponding the respective coordinate positions of the certain mark with the coordinate positions of the two or more standard points stored previously, and for recognizing the position of the projected image on the viewing surface of the white-board device.

7. The method for aligning the positions of the images of claim 6, further comprising:
a fourth step for receiving the scanned image data from the white-board device; and
a fifth step for combining the scanned image data with the projective image data, based on the position of the projected image on the viewing surface, recognized by the third step.

8. The method for aligning the positions of the images of claim 7, wherein when the scanned image and the projected image are partially overlapped with each other, the images to be combined by the fifth step represent (1) images on an area including the whole of the scanned image and the whole of the projected image,
(2) images combining the scanned image with the partially overlapped portion of the projected image, or
(3) images combining the projected image with the partially overlapped portion of the scanned image.

9. The method for aligning the positions of the images of claim 6, wherein in case that a forbidden display area has been determined on the viewing surface, the third step judges whether the projected image overlaps on the forbidden display area, based on the position of the projected image on the viewing surface, and if the projected image overlaps on the forbidden display area,
the image processing section alarms that the projected image overlaps on the forbidden display area, or
the image processing section reduces the projected image so that the projected image does not overlap on the forbidden display area.

10. The method for aligning the positions of the images of claim 6, wherein the standard point represents a lattice point printed on the viewing surface of the white-board device.

11. An image combining apparatus, which is configured to be connected with a white-board device, which has a viewing surface and is configured to scan a depicted image depicted by a user on the viewing surface, and to output scanned image data, and an image projecting device, which is configured to project image data on the viewing surface, based on projective image data, wherein the image combining apparatus, which is configured to combine the scanned image data of the depicted image with the projective image data, comprises:
an image outputting section for outputting the projective image data to the image projecting device;
an image processing section for generating projective image data for displaying an image of a mark at two or more positions on the viewing surface of the white board;
a memory section for memorizing coordinate positions of two or more points on the viewing surface of the white-board device; and
an image inputting section for receiving the scanned image data from the white-board device,
wherein the image processing section is configured to obtain the two or more positions of the mark when the mark is aligned with each of the coordinate positions of the two or more points, and the image processing section is further configured to make correspondence with the respective positions of the mark and the coordinate positions of the two or more points respectively, whereby the image processing position recognizes the position of the projected image on the viewing surface of the white-board device.

* * * * *